OMITTED-COVER-PAGE

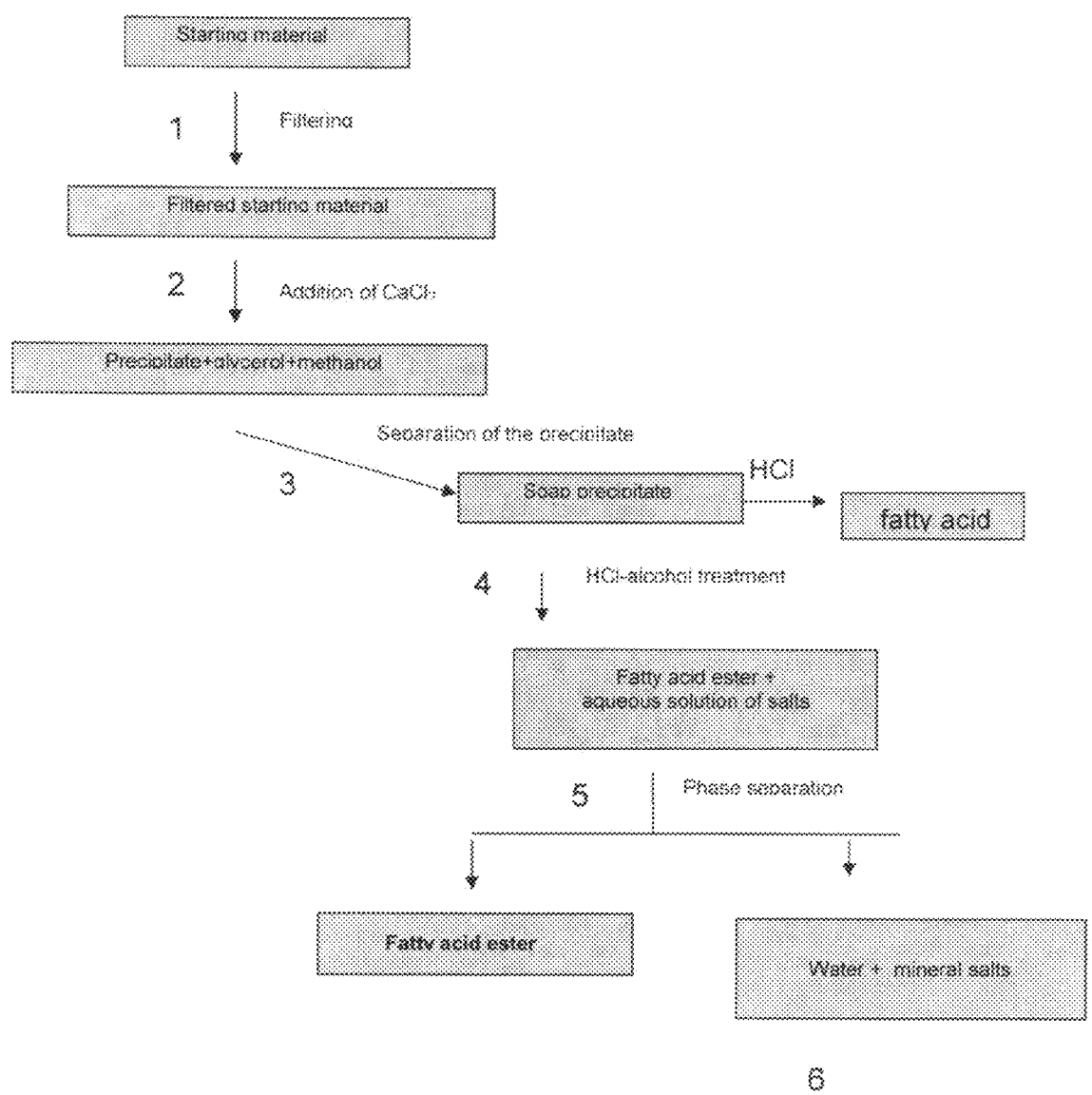

PRODUCTION OF FATTY ACID AND FATTY ACID ESTER

The present invention concerns a process for forming a fatty acid, a fatty acid ester or a mixture thereof from a starting material comprising soap, as well as use of the formed mixture.

BACKGROUND OF THE INVENTION

Biodiesel is mainly the methyl ester of fatty acids that is formed through the transesterification of long-chained fatty acids with an alcohol (methanol). The fatty acid esters of natural fats consist mainly of triglycerides, whereby a water-soluble glycerol that is unacceptable as biodiesel is released in the transesterification. Further, an alcohol (methanol) mixed into the aqueous glycerol solution and salts of fatty acids (later soap) are released in the process. This fraction containing glycerol, alcohol and soap still has, particularly with regard to the soap, a high energy content. Theoretically, 10% by weight of glycerol is generated from the triglyceride. Depending on the process conditions, the proportion of the soap can vary greatly and rise up to tens of percent from the original total amount of triglyceride. Since the soap compounds are dispersed and partly dissolved in the aqueous solution of the formed glycerol, their separation from the aqueous solution is difficult. The soap disrupts the phase between the fat-soluble fatty acid esters and the water-soluble glycerol and tends to form different degrees of emulsions, creating a challenging problem in large-scale processes with regard to separation techniques. Removal of the alcohol, such as methanol, would also require expensive vacuum distillation. Thus, it can be concluded, that manufacturing biodiesel using the afore-described method in modern technology is underutilization of the most energy-rich parts of the raw material. Purification of the compounds generated in the process in order to increase their value of use is highly uneconomical already merely with regard to the purification steps required.

To a great extent due to the aforementioned reasons, no cost-effective solutions for the utilization of the mixture of aqueous glycerol, soap and alcohol (methanol) have been found.

There are no business economically advantageous solutions for transforming the multi-component mixtures containing glycerol as a component into commercial products. The significance of this technological deficiency is emphasized particularly as the interest grows towards renewable sources of energy raw materials in addition to the fossil raw materials.

BRIEF DESCRIPTION OF THE INVENTION

The present invention concerns a process for forming a fatty acid, a fatty acid ester or a mixture thereof from a starting material comprising soap.

The invention provides a new solution to a problem that relates to a process wherein esters of fatty acids are produced according to an established method using methanol or other short-chained alcohols from glycerolipid-containing fat by treating them with alkali metal alkoxides. Glycerol and other alcohols as well as a water-soluble alkali metal salt of fatty acids, soap, are formed in the process. The glycerol and the soap of the mixture decrease the utilization degree of the total carbon contained in the original fat used in the process and, thus, the economic efficiency of the process. An essential disadvantage of the utilization of the glycerol that is formed in the production of biodiesel, compared with pure glycerol, is the water, the soap and the toxic methanol or other short-chained alcohol it contains as impurity.

It is known that the presence of soap in water and in a mixture containing water-insoluble oil prevents the separation of the aqueous and the oil phases from each other. In the aqueous solution of an impure polyhydric alcohol, the soap disrupts the phase between the water and the lipid formed from fatty acid esters so that separating the phases becomes complicated and, even at the best case, it contains water and other components that better dissolve in the aqueous phase.

An advantage of the invention is an integrated unit operation entity, by means of which an ester that is formed from a hydrocarbon-chain-containing fatty acid and short-chain alcohols can be reformed from a difficulty energy-economically utilizable impure glycerol minor flow, which is released from the transesterification of organic fats. The apparatus used in the process is simple and the technology associated with it is known with regard the production and the use. The process according to the invention is not bound to production scale, but it is readily scalable.

The invention enables, inter alia, the recovery of the energy-rich soap and the recycling into alcohol esters of fatty acids or free fatty acids. A process technical and economical advantage of the invention is that, by means of it, the total utilization of the carbon of the fraction consisting of compounds that contain alcoholic groups and containing impurities can be solved for the manufacturing of fatty acid esters and fatty acids by a process that neither demands energy requiring unit operations, such as heating, nor pressurized unit operations and, which for functioning requires only the use of such chemicals, which can be incorporated into the inner circulation of the process according to the invention.

Compared to the prior art, in every aspect the invention more efficiently fulfils the principles of sustainable development by intensifying the total utilization of the raw materials and by thus decreasing the need for using other raw materials. The process according to the invention consists of a functional entity having the prerequisites for updating the production costs of fatty acids and alcohol esters thereof to a level accepted by consumers.

BRIEF DESCRIPTION OF THE DRAWINGS

FIG. 1 depicts the main execution steps of the process according the invention.

DETAILED DESCRIPTION OF THE INVENTION

Since no profitable solutions have been found for the utilization of a mixture comprising soap and a polyhydric alcohol and a monohydric alcohol, these components should somehow be separated from each other in order to utilize said components separately.

We have found that soap can readily be precipitated apart from the glycerol-comprising oil-water-alcohol emulsion, the naturally separating precipitate be recovered and a methylation procedure be performed on the precipitate, whereby finished biodiesel, i.e. a methyl ester of a fatty acid, is formed from the soap. Also other esters can be produced through the process. In this respect, the soap components of the impure glycerol fraction are already favorable as raw materials for biodiesel. Thus, the soap can be separated almost quantitatively from the other components. The remaining glycerol solution, without the presence of soap, can be utilized separately.

Thus, the present invention concerns a process for forming a fatty acid, a fatty acid ester or a mixture thereof from a starting material comprising soap, preferably an alcohol and soap. The alcohol is preferably methanol, ethanol, 1-propanol or a polyhydric alcohol, most preferably glycerol.

The term "soap" means a salt of a fatty acid.

Particularly, the present invention concerns a process, which comprises steps, wherein a metal-ion forming agent is added to said starting material to produce a mixture comprising an insoluble phase and a liquid phase. The insoluble phase is separated from the liquid phase and acid is added to the former. After separating the insoluble phase it is preferred to repeat the addition of the precipitating ion-forming agent to the liquid phase and to treat the formed precipitate as above. This step can be repeated until the formation of precipitate has essentially decreased. Acid is added to the combined insoluble phase to form fatty acid. The fatty acids are recovered and used as such or a monohydric alcohol and an acid catalyst are added to form fatty acid ester. Thus, two phases are formed, an aqueous phase and an organic phase. These phases are separated from each other and preferably both collected. The organic phase thus contains the fatty acid ester. Optionally, a monohydric alcohol and an acid are added to the insoluble phase without separate recovery of the fatty acid, whereby an aqueous phase and an organic phase is also formed, of which the organic phase contains the fatty acid ester.

Thus, the fatty acid can be used as such or a fatty acid ester, suitable for biodiesel, can be formed therefrom using a monohydric short-chained alcohol by treating the fatty acid with said alcohol. The procedures required by the described process can be carried out by a person skilled in the art, and without complex apparatuses, likewise the required additives (reagents) are known, safe and they have an established final form of use.

Generally, the invention comprises a process based on mainly natural steps, by which a long-chained fatty acid or a fatty acid ester is produced from an organic soap or mixtures thereof. In this context, the term "long-chained" means a hydrocarbon chain of at least $C_4$, i.e. a hydrocarbon chain, having at least 4 carbon atoms. Preferably, the hydrocarbon chain has a length of $C_{10}$ to $C_{20}$, more preferably $C_{12}$ to $C_{20}$.

Thus, the process of the invention comprises the steps of:
  transforming a water-soluble or dispersed soap formed from fatty acids into the form of a water-insoluble soap by means of a metal-ion forming agent, and
  esterifying the water-insoluble soap formed from fatty acids with an alcohol into an alcohol ester of fatty acids or transforming it with an acid treatment into a free fatty acid.

According to a preferred embodiment of the invention, the method comprises the steps of
  optionally adding acid, preferably an organic acid, more preferably acetic acid, formic acid or lactic acid, to the starting material to adjust the pH to a value of 3 to 8, preferably to a value of 6 to 8,
  adding a metal-ion forming agent, such as mineral salt of an alkali earth metal, preferably an agent that forms $Ca^{2+}$ or $Mg^{2+}$, more preferably calcium chloride or magnesium chloride, most suitably calcium chloride, to the mixture as a solid or as an aqueous solution, in an amount that precipitates at least 40% of the soap, preferably in an amount, using which a stoichiometric amount of metal-ion is formed with regard to the amount of soap, most preferably a 5 to 10% by weight stoichiometric excess, whereby an insoluble phase and a liquid phase are formed, wherein the insoluble phase comprises the soap and the liquid phase comprises the polyhydric alcohol, preferably glycerol, and the monohydric alcohol, preferably methanol, ethanol or 1-propanol, most suitably methanol, or a mixture thereof,
  separating the insoluble phase, where the soap has been transformed into an insoluble soap, from the first liquid phase, preferably by filtering or by decanting or by another procedure generally used for recovering a precipitate,
  adding an acid, preferably hydrochloric acid or sulphuric acid, to the insoluble phase, whereby a fatty acid or a mixture of fatty acids is formed,
  optionally, the acid treatment can be carried out using a mixture of an acid catalyst and an alcohol, where the acid catalyst preferably is hydrochloric acid or sulphuric acid, whereby an organic phase, which comprises a fatty acid ester or a mixture of fatty acid esters, and an aqueous phase, which comprises water and mineral salts, are formed, and
  collecting the organic phase.

According to another preferred embodiment of the present invention, a mixture, which is a fraction formed as a result of the transesterification of a lipid, is used as a starting material in the process. According to a particularly preferred embodiment, the molar amount of the monohydric alcohol to be added to the fatty acid fraction with regard to the molar amount of the organic matter is at least 40%, preferably an equivalent amount.

Particularly preferably, the invention contains the steps, wherein the optional solid matter components are removed from the starting material by filtering. After this, the acidity of the starting material is adjusted using a necessary amount of an acid, preferably acetic acid, formic acid or lactic acid, most suitably acetic acid.

The soluble soap present in the filtered starting material is transformed into an insoluble soap by adding a metal-ion forming agent to the mixture, preferably a mineral salt of a bivalent alkali earth metal, more preferably a mineral salt of $Ca^{2+}$, most preferably $CaCl_2$. Most suitably, the salt is added as a solid, whereby significant amounts of water can be avoided. The mixing time is controlled, until the formation of the precipitate has essentially stopped. When the solids have been separated from the liquid phase, e.g. by filtering, a moist "soap cake" remains, which according to a particularly preferred embodiment is dried, after which mostly 5% by weight, preferably 0.1 to 4% by weight, most suitably 0.1 to 2.5% by weight of water remains in the precipitate.

The insoluble fraction (precipitate) formed is separated from the liquid fraction by filtering or by decanting or by other methods generally used for recovering a precipitate. An acid treatment is carried out for the insoluble fraction, preferably by using hydrochloric acid as an aqueous solution, most suitably in a concentration of 0.5 to 10%. Acid is added in an amount that is sufficient to release the fatty acids.

According to a particularly preferred embodiment of the invention, the acid treatment and the esterification are carried out as an acid catalyzed esterification or by gradually esterifying. Preferably, an HCl-methanol treatment is performed on the soap precipitate at a temperature exceeding the boiling point of methanol, more preferably at over 65° C., most suitably at 80° C. As a result of the treatment, a two-phase mixture is formed, of which the second phase, i.e. the organic phase, is formed of methyl esters of a fatty acids, which are collected. It is preferred to add the phase containing the salt formed in the esterification into the starting material. Thus, the aqueous solution containing mineral salts released in the esterification can be recycled to the step of mineral salt treatment of the soap.

The compounds that are added in the different steps of the process, such as the bivalent alkali earth metal salts, such as $CaCl_2$ or the side fractions formed by these, apart from NaCl, do not leave the process totally, but they are preferably recycled internally in the process or they form separate economically utilizable fractions and thus improve the total economics of the process.

According to a particularly preferred embodiment of the present invention, the produced fatty acid is used for manufacturing alcohol esters of fatty acids. More preferably, these fatty acid esters and the fatty acid esters produced by means of the invention are used further in manufacturing biofuels, such as biodiesel. Most conveniently, the product of the present invention is suitable as a feed in the esterification of fatty acids or in processes, where plant or animal based lipids are hydrotreated, particularly as a feed in processes, where so called HVO ("hydrogenated vegetable oil") is manufactured.

According to a preferred embodiment, the esters of the invention are used in manufacturing biodiesel or renewable diesel. Correspondingly, the fatty acids can be used for other fuels, analogous to diesel.

Correspondingly, the starting material used in the process of the present invention is preferably obtained, e.g. from the methanol-containing glycerol fraction generated in the manufacturing of biodiesel, which generally contains at least about 2 to 10% of soap. Since water causes the formation of soap in the transesterification, its presence in the present invention is not detrimental, but in the aforementioned transesterification the amounts of water and a monohydric alcohol are minimized. Less than 20%, preferably 2 to 10%, of water is released into said methanol-containing glycerol fraction. This water content is preferred in the starting material used in the process of the present invention.

"Biodiesel" means, according to the EU-directive 2003/30/EY "a methyl-ester produced from vegetable or animal oil, of diesel quality to be used as biofuel". Thus, biodiesel consists of fatty acid esters.

On the other hand, with the term "renewable diesel" is meant a hydrotreated fat of an animal, a plant or a microbe, whereby "microbe fat" means a fat that is derived from bacteria, yeast, mould, alga or other microorganism.

Both the fatty acids and the fatty acid esters formed in the invention can be utilized for the manufacturing of biofuels. They can be used as such or they can be blended with other components, or the acid or ester structures can be degraded using methods known in the art and the double bonds can be saturated, whereby an n-paraffin product is obtained, which on the other hand can be mixed into the other components.

EXAMPLES

Example 1

The Manufacturing of Fatty Acid Esters 0.5 liters of the minor fraction containing glycerol and soap, generated from biodiesel production using rapeseed oil, was measured and solid calcium chloride was added therein under stirring until no more precipitate was formed (0.9 moles). The soap precipitate was separated from the liquid glycerol fraction through filtering and was washed with water, after which the precipitate was dried. Thus, 171 g of essentially dry precipitate was obtained.

0.54 g of the obtained precipitate was weighed and 2 ml of a mixture of methanol and hydrochloric acid, wherein the portion of methanol was 45.8% and the portion of acid was 54.2%, was added therein. The mixture was heated in a closed container to 80° C. for one half hour and the fatty acid methyl esters (1 ml) were separated therefrom through conventional separating procedures.

Example 2

The Manufacturing of Fatty Acids and Their Esterification

The above obtained precipitate was treated with hydrochloric acid so that the pH of the aqueous layer was permanently acidic (pH=2). The mixture was heated to 62° C. and the surface layer containing fatty acids was separated therefrom. The salts were removed from the layer through washing with water, after which the water remaining in the layer after the wash as well as the water formed with the fatty acids was removed by drying using a dehydrating agent, whereby the fatty acids remained.

11.4 g of the obtained fatty acid mixture was weighed and methanol (a quadruple molar amount) as well as HCl gas as a catalyst were added therein. The formed oil layer was washed with a methanol-water mixture as well as with water until the washing water was neutral, after which an oily ester layer (6 ml) was separated from the formed oil-solution mixture.

Both the obtained fatty acid mixture and the corresponding fatty acid ester mixture are well suited, for example, for the manufacturing of diesel fuels.

The invention claimed is:

1. A process for forming a mixture of fatty acids and fatty acid esters from a starting material containing soap and alcohol, wherein the alcohol is methanol, ethanol, 1-propanol or a polyhydric alcohol or a mixture of several alcohols, characterized by
    adding a metal-ion forming agent into the starting material, said metal-ion forming agent transforming the soap into a precipitate, to produce a mixture containing an insoluble phase and a liquid phase,
    separating the insoluble phase from the liquid phase, and
    adding an acid into the insoluble phase to form a fatty acid, and forming a fatty acid ester by adding a monohydric alcohol and an acid catalyst to the acid-containing insoluble phase to form a fatty acid ester, whereby two phases are formed, an aqueous phase and an organic phase, or by adding first an acid and then adding a monohydric alcohol and an acid catalyst into at least a portion of the formed fatty acid to esterify the fatty acid.

2. The process according to claim 1, characterized in that the polyhydric alcohol is glycerol.

3. The process according to claim 1, characterized in that the starting material is a fraction formed as a result of the transesterification of a lipid.

4. The process according to claim 1, characterized in that the metal-ion forming agent is calcium chloride or magnesium chloride.

5. The process according to claim 1, characterized by adding the metal-ion forming agent as a solid or as a liquid.

6. The process according to claim 1, characterized by adding the metal-ion forming agent in an amount that precipitates at least 40 mol-% of the soap of the starting material.

7. The process according to claim 1, characterized in that the insoluble phase comprises the soap.

8. The process according to claim 1, characterized in that the liquid phase comprises the polyhydric alcohol or the monohydric alcohol or a mixture of several alcohols.

9. The process according to claim 1, characterized by adding an acid into the insoluble phase, whereby a fatty acid or a mixture of fatty acids is formed.

10. The process according to claim 1, characterized by adding a monohydric alcohol and an acid catalyst, into the insoluble phase to form a fatty acid ester.

11. The process according to claim 1, characterized by adding first an acid to the insoluble phase to form a fatty acid, and then adding a monohydric alcohol and an acid catalyst into at least a portion of the formed fatty acid to esterify the fatty acid.

12. The process according to claim 10, characterized in that the molar amount of monohydric alcohol compared to the molar amount of organic matter is at least 40%.

13. The process according to claim 11, characterized in that the molar amount of monohydric alcohol compared to the molar amount of organic matter is at least 40%.

14. The process according to claim 1, characterized in that the organic phase comprises a fatty acid ester or a mixture of fatty acid esters and the aqueous phase comprises water and mineral salts.

15. The process according to claim 1, characterized by separating the organic phase and the aqueous phase from each other and collecting them.

16. The process according to claim 1, characterized in that the metal-ion forming agent is calcium chloride.

17. The process according to claim 1, characterized by adding the metal-ion forming agent as a solid.

18. The process according to claim 1, characterized by adding the metal-ion forming agent in an amount through which a stoichiometric amount of metal ion is formed with regard to the amount of soap.

19. The process according to claim 1, characterized by adding the metal-ion forming agent in an amount through which a stoichiometric amount of metal ion in excess of 10 mol-% is formed with regard to the amount of soap.

20. The process according to claim 1, characterized by adding hydrochloric acid or sulphuric acid into the insoluble phase, whereby a fatty acid or a mixture of fatty acids is formed.

21. The process according to claim 1, characterized by adding a monohydric alcohol and an acid catalyst into the insoluble phase to form a fatty acid ester, wherein the acid catalyst is hydrochloric acid or sulphuric acid.

22. The process according to claim 10, characterized in that the molar amount of monohydric alcohol compared to the molar amount of organic matter is an equivalent amount.

23. The process according to claim 11, characterized in that the molar amount of monohydric alcohol compared to the molar amount of organic matter is an equivalent amount.

* * * * *